United States Patent
Gritti et al.

(10) Patent No.: US 10,605,684 B2
(45) Date of Patent: Mar. 31, 2020

(54) MULTI-TRANSDUCER MODULUS, ELECTRONIC APPARATUS INCLUDING THE MULTI-TRANSDUCER MODULUS AND METHOD FOR MANUFACTURING THE MULTI-TRANSDUCER MODULUS

(71) Applicant: STMICROELECTRONICS S.R.L., Agrate Brianza (IT)

(72) Inventors: Alex Gritti, Vimercate (IT); Marco Omar Ghidoni, Melzo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 119 days.

(21) Appl. No.: 15/605,559

(22) Filed: May 25, 2017

(65) Prior Publication Data
US 2018/0149538 A1    May 31, 2018

(30) Foreign Application Priority Data

Nov. 30, 2016   (IT) .......................... 102016000121223

(51) Int. Cl.
| | | |
|---|---|---|
| G01L 19/00 | (2006.01) | |
| H04R 19/00 | (2006.01) | |
| G01L 9/00 | (2006.01) | |
| G01L 9/08 | (2006.01) | |
| G01L 11/06 | (2006.01) | |
| G01L 19/14 | (2006.01) | |

(52) U.S. Cl.
CPC ........ *G01L 19/0092* (2013.01); *G01L 9/0045* (2013.01); *G01L 9/0054* (2013.01); *G01L 9/08* (2013.01); *G01L 11/06* (2013.01); *G01L 19/147* (2013.01); *H04R 19/005* (2013.01); *G01L 2019/0053* (2013.01); *H04R 2201/003* (2013.01)

(58) Field of Classification Search
None
See application file for complete search history.

(56) References Cited

U.S. PATENT DOCUMENTS

| | | | |
|---|---|---|---|
| 6,554,774 B1 * | 4/2003 | Miele ................. | A61B 5/02028 600/485 |
| 8,575,710 B2 | 11/2013 | Villa et al. | |
| 8,804,982 B2 * | 8/2014 | Michel ................... | H04R 19/04 381/111 |
| 10,189,703 B2 * | 1/2019 | Ghidoni ................... | B81B 7/02 |
| 2013/0322675 A1 | 12/2013 | Zoellin et al. | |
| 2014/0003633 A1 * | 1/2014 | Liu .......................... | H04R 1/04 381/174 |
| 2014/0319630 A1 | 10/2014 | Conti et al. | |

(Continued)

FOREIGN PATENT DOCUMENTS

| | | |
|---|---|---|
| CN | 203554647 U | 4/2014 |
| WO | 2013/156539 A1 | 10/2013 |

*Primary Examiner* — Natalie Huls
*Assistant Examiner* — Jermaine L Jenkins
(74) *Attorney, Agent, or Firm* — Seed Intellectual Property Law Group LLP

(57) ABSTRACT

A transducer modulus, comprising: a supporting substrate; a cap, which is arranged on the supporting substrate and defines a chamber therewith; a pressure transducer in the chamber; an acoustic transducer in the chamber; and a processing chip, or ASIC, operatively coupled to the pressure transducer and to the acoustic transducer. The pressure transducer and the acoustic transducer are arranged on top of one another to form a stack.

23 Claims, 7 Drawing Sheets

(56) References Cited

U.S. PATENT DOCUMENTS

| | | | |
|---|---|---|---|
| 2015/0023523 A1* | 1/2015 | Elian | H04R 1/083 |
| | | | 381/91 |
| 2015/0321906 A1 | 11/2015 | Tsai et al. | |
| 2017/0064458 A1* | 3/2017 | Chen | B81B 7/0064 |
| 2017/0334714 A1* | 11/2017 | Gao | B81B 7/02 |

\* cited by examiner

MULTI-TRANSDUCER MODULUS, ELECTRONIC APPARATUS INCLUDING THE MULTI-TRANSDUCER MODULUS AND METHOD FOR MANUFACTURING THE MULTI-TRANSDUCER MODULUS

BACKGROUND

Technical Field

The present disclosure relates to a multi-transducer modulus, to an electronic apparatus including the multi-transducer modulus, and to a method for manufacturing the multi-transducer modulus.

Description of the Related Art

As is known, transducers and sensors of a MEMS (Micro-Electro-Mechanical System) type comprise a sensitive structure, which is able to transduce an environmental quantity into an electrical quantity (transduced signal). A reading electronics receives the transduced signal and is designed to carry out appropriate operations of processing (amongst which operations of amplification and filtering) of said electrical quantity so as to supply an electrical output signal (for example, a voltage) representing the environmental quantity detected by the sensitive structure.

Typically, the transducer and the reading electronics are housed in a same package provided with an internal cavity, and are arranged alongside one another. The package is typically mounted on a PCB (Printed-Circuit Board).

There is increasingly felt the need to optimize the space inside the package in order to be able to house a plurality of sensors or transducers.

Solutions that envisage a plurality of transducers of the same type arranged side by side are known in the state of the art. However, these solutions present the disadvantage of requiring packages of large dimensions, in proportion to the number of transducers housed therein.

Sharing of the internal cavity of the package by a plurality of transducers of different types introduces several technical difficulties, in so far as different sensors need space of their own and connections towards the outside of their own in order to acquire the environmental quantities to be detected without interfering with operation of the other transducers.

BRIEF SUMMARY

One or more embodiments of the disclosure integrate transducers, such as transducers of different types in a same package, and optimize the occupation of space without altering the performance of the transducers.

According to the present disclosure, a multi-transducer modulus, an electronic apparatus including the multi-transducer modulus, and a method for manufacturing the multi-transducer modulus, are provided.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 1:
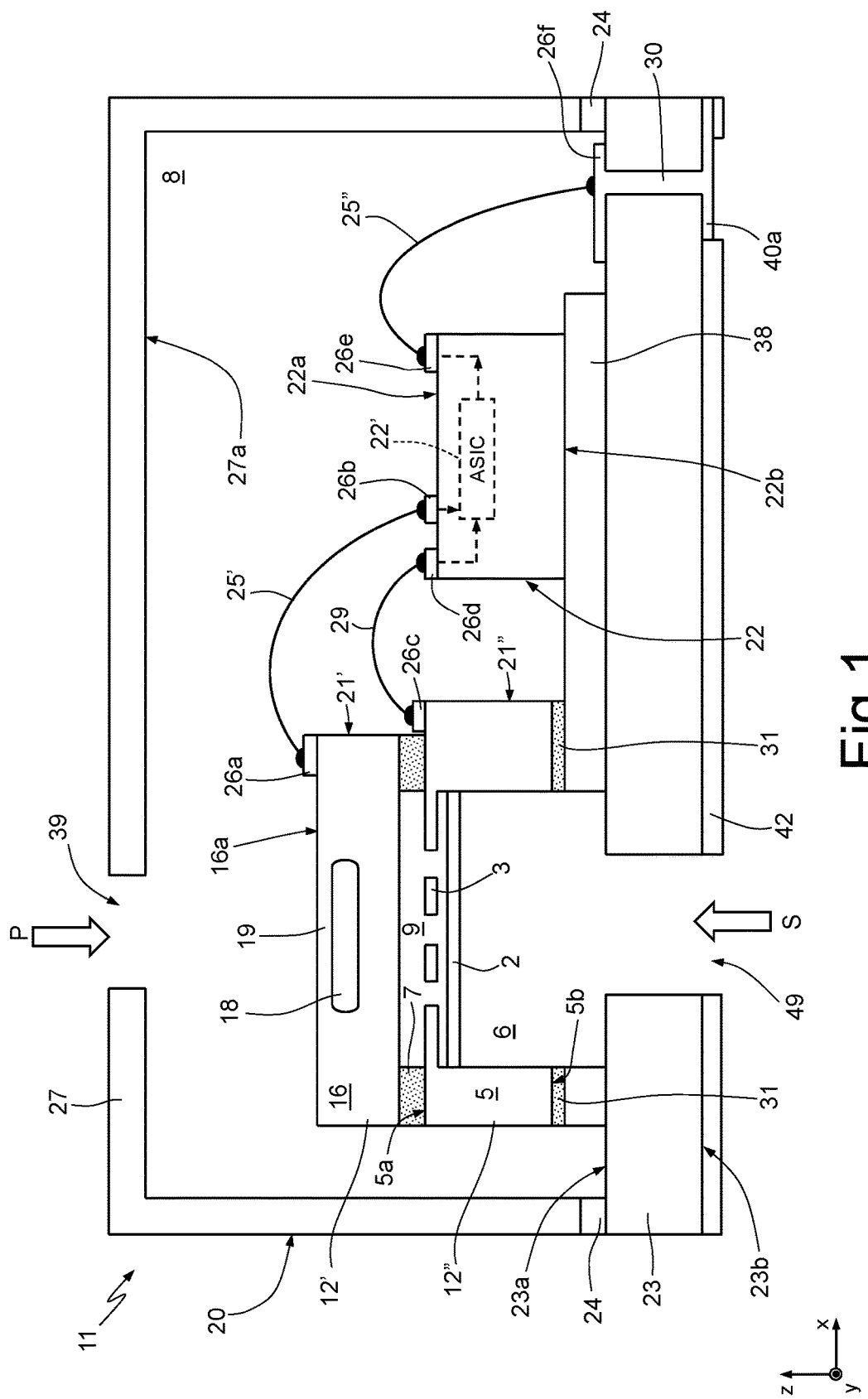
FIGS. 1-6 illustrate multi-transducer moduli according to respective embodiments of the present disclosure.

With reference to FIG. 1, a multi-transducer modulus 11 according to one aspect of the present disclosure is represented, in a system of spatial co-ordinates X, Y, and Z and in lateral-sectional view. The present description will make explicit reference to a multi-transducer modulus including a first MEMS transducer 12' configured to transduce an environmental pressure P into a first electrical signal (first transduced signal) and a second MEMS transducer 12" configured to transduce a sound wave S into a second electrical signal (second transduced signal). The first and second transducers 12', 12" are operatively coupled to a same control chip 22 which integrates a processing circuit, in particular an ASIC (Application-Specific Integrated Circuit) 22'. The ASIC 22' receives the first and second transduced signals, in order to process them.

The teaching according to the present disclosure likewise applies to transducers of a type different from what is shown in FIG. 1, as is evident to a person skilled in the art.

The multi-transducer modulus 11 comprises a substrate 23 having a top side 23a on which a cap 27 is arranged, which defines a cavity, or chamber, 8. In one embodiment, the substrate 23 is a substrate of an LGA (Land-Grid Array) type. In an alternative embodiment, the substrate 23 is made of semiconductor material (e.g., silicon), obtained using known micromachining processes. The cap 27 may be made of metal or pre-molded plastic material and has a through opening 39 designed to arranged the chamber 8 in fluidic communication with an environment external thereto. In the context of the present disclosure, by "fluidic connection" is meant a connection that enables passage from and to the chamber 8 of a liquid and/or a gas, including air, according to the specifications.

The cap 27 is coupled to the substrate 23 by one or more coupling regions 24 (soldering regions, or regions of glue, or the like). The substrate 23 and the cap 27 together form a package 20.

The first MEMS transducer 12' is integrated in a first sensor chip 21' that is housed in the chamber 8 and integrates one or more MEMS structures for transduction of environmental-pressure signals into electrical signals. In particular, the transduction is carried out with the aid of piezoresistors. In one embodiment, the first sensor chip 21' comprises a structural body 16 of semiconductor material, preferably silicon, in particular monocrystalline silicon, for example, of an N type with orientation (100) of the crystallographic plane. The structural body 16 is, for example, of a monolithic type and has, in one embodiment, a quadrangular section delimited at the top by a front surface 16a and at the bottom by a rear surface 16b, opposite and parallel to the front surface 16a. In one embodiment, the front surface 16a forms a front side of the first sensor chip 21', and the rear surface 16b forms a rear side of the first sensor chip 21'. The structural body 16 includes a buried cavity 18, having, for example, a square section. The cavity 18 is separated from the front surface 16a by a thin portion of the structural body 16, which forms a membrane 19. According to a non-limiting embodiment, the thickness of the membrane 19 is smaller than the thickness of the first cavity 18 in order to prevent shear stresses at the points of constraint of the membrane 19, which could cause failure of the membrane itself. The cavity 18 may be provided according to any desired manufacturing process, not described in detail herein in so far as it does not form the subject of the present disclosure. The European patent EP1577656, which also published as U.S. Pat. No. 8,575,710, describes a method for manufacturing buried cavities designed for this purpose.

At least partially integrated within the membrane 19, piezoresistive sensing elements are present (in particular, four in number, arranged at the vertices of an ideal cross centered at the center of the membrane 19—not illustrated in FIG. 1), for instance formed by doped regions, for example, with doping of a P type. The piezoresistive sensing elements may be obtained via diffusion of dopant atoms through an appropriate diffusion mask and have, for example, an approximately rectangular section. Further, the piezoresistive sensing elements may be connected together so as to form a Wheatstone-bridge circuit. Alternatively, the first piezoresistive sensing elements may form part of a ring oscillator circuit.

The second MEMS transducer 12" is integrated in a second sensor chip 21" that is housed in the chamber 8 and integrates one or more MEMS structures for transduction of acoustic signals into electrical signals; in particular, the transduction is based upon capacitive coupling.

By way of example, the second transducer (acoustic transducer) 12" is provided with a membrane 2, which is mobile and includes a layer of conductive material, facing a rigid plate 3 (by this term is here understood an element that is relatively rigid as compared to the membrane 2, which is, instead, flexible), also known as "backplate". The backplate 3 includes a conductive layer facing the membrane 2 so that the membrane 2 and the backplate 3 form facing plates of a capacitor.

The backplate 3 may comprise a plurality of holes, of any shape, for example circular, having the function of favoring, during the manufacturing steps, removal of underlying layers and, in use, of enabling free circulation of air between the backplate 3 and the membrane 2, reducing the "squeeze film" damping effect. For similar reasons, also the membrane 2 may present one or more holes (not illustrated).

The membrane 2, which in use undergoes deformation as a function of incident sound-pressure waves, is at least partially suspended over a structural layer 5 of semiconductor material and directly faces a cavity 6, obtained by removing material, such as by etching, at a rear surface 5b of the structural layer 5 (the rear surface 5b is opposite to a front surface 5a of the structural layer 5 itself, arranged in the proximity of the membrane 3). The backplate 3 is arranged alongside the membrane 2 on the opposite side with respect to the cavity 6, i.e., in the proximity of the front surface 5a of the structural layer 5. The cavity 6 is delimited on one side by the membrane 2 and faces, on the opposite side, the substrate 23.

A through hole 49 in the substrate 23 defines a sound port of the second transducer 12" and enables acoustic coupling of the cavity 6 with the environment external to the package 20. In this context, the cavity 6 is known as front chamber, and is the hollow region facing the membrane 2 through which the sound wave that, in use, deforms the membrane 2 arrives.

According to an aspect of the present disclosure, the first and second sensor chips 21', 21" are arranged stacked on one another, and in particular so that the rear surface 16b of the structural body 16 faces the front surface 5a of the structural body 5. More in particular, the first and second sensor chips 21', 21" are so that the membrane 19 overlies, at least in part, in a view in the plane XY, the transducer assembly formed by the membrane 2 and the backplate 3.

A coupling region 7 extends between the first and second sensor chips 21', 21", coupling them together. According to a non-limiting aspect of the present disclosure, the coupling region 7 is made of non-conductive glue and is shaped like a frame that extends along outer edge regions of the rear surface 16b of the structural body 16 and of the front surface 5a of the structural body 5. The thickness, along Z, of the coupling region 7 defines a volume, between the first and second sensor chips 21', 21", which forms a back chamber 9 of the second transducer 12". The back chamber is the hollow region that extends on the opposite side of the membrane 2 with respect to the front chamber.

To optimize the performance of the second transducer 12", it is preferable to maximize the volume of the back chamber 9. For this purpose, the thickness of the coupling region 7 is maximized, taking into account the space available within the package 20 and the limits of the technology used for forming the coupling region 7. By way of example, the present applicant has found that, in the case where the coupling region 7 is made of glue (in particular, non-conductive glue), a thickness of said region comprised between 50 and 100 µm provides at the same time structural solidity and good performance of the second transducer 12". It is evident that it is possible to reduce the aforementioned thickness by reducing the total thickness of the stack formed by the sensor chips 21', 21", or else to increase the aforementioned thickness, for example by forming the backplate 3 at a height (along Z) lower than the height reached by the front surface 5a.

As has been said, the chamber 8 further houses the control chip 22, which integrates the ASIC 22'. The ASIC 22', which is per se known, is shared by both the first and second sensor chips 21', 21" and comprises circuits for processing the signal generated by the acoustic transducer 12" (for example, a charge-amplifier circuit for a capacitive electroacoustic sensor) and the components specified for enabling proper processing of the signals generated by the piezoresistive elements of the pressure transducer 12'.

The control chip 22 is electrically coupled to the first and second transducers 12', 12" by a plurality of respective conductive wires 25', 29 (only some of which are illustrated in the figure), formed with the wire-bonding technique. The wire bonds 25' connect together respective pads 26a and 26b belonging, respectively, to the first transducer 12' and to the control chip 22; the wire bonds 29 connect together respective pads 26c and 26d belonging, respectively, to the second transducer 12" and to the control chip 22. To be able to form and contact the pads 26c, the extension in the plane XY of the front surface 5a of the second sensor chip 21" is greater than the extension, once again in the plane XY, of the rear surface 16b of the first sensor chip 21'.

Further electrical connections 25" (only one of which is illustrated in FIG. 1), for example formed with the wire-bonding technique, are provided for coupling one or more pads 26e of the control chip 22 to respective pads 26f present on the substrate 23 in the chamber 8.

The control chip 22 is arranged alongside the stack formed by the first and second sensor chips 21', 21".

The second sensor chip 21" is coupled to the substrate 23 at the rear surface 5b of the structural body 5, in particular by a solder mask 38 and to the latter by a coupling layer 31 of adhesive material or glue (preferably non-conductive glue). As has been said, the first sensor chip 21' is mounted on the second sensor chip 21". In one embodiment, the coupling layer 31 extends all along the base perimeter of the structural body 5, to form an annular fluid-tight region such that the cavity 6 and the chamber 8 are fluidically isolated from one another. This may prove useful in specific applications in which it is desired to maintain a fluidic isolation between the through opening 39 and the through opening 49

(for example, because the two openings face respective environments isolated from one another). The solder mask 38 and the coupling layer 31 extend, in a view in the plane XY, laterally with respect to the through opening 49, surrounding it, so as not obstruct it.

Also the control chip 22 is coupled to the substrate 23 via the solder mask 38. Other modalities of coupling of the chips 21" and 22 to the substrate 23 may be envisaged, according to the need.

With reference to the substrate 23, appropriate metallization layers and/or conductive through vias have the function of routing the electrical signals from inside the chamber 8 to the outside of the package 20 (a conductive through via 30, which connects the metallizations on both sides of the substrate 23, is illustrated in FIG. 1).

Electrical-connection elements 40a, for example in the form of conductive lands, are provided on a bottom side 23b of the substrate 23 (the side exposed towards the outside of the chamber 8, opposite to the top side 23a), for soldering and electrical connection to a PCB, and/or for testing operations. A further solder mask 42 may be applied at the bottom side 23b of the substrate 23.

Figure 2:
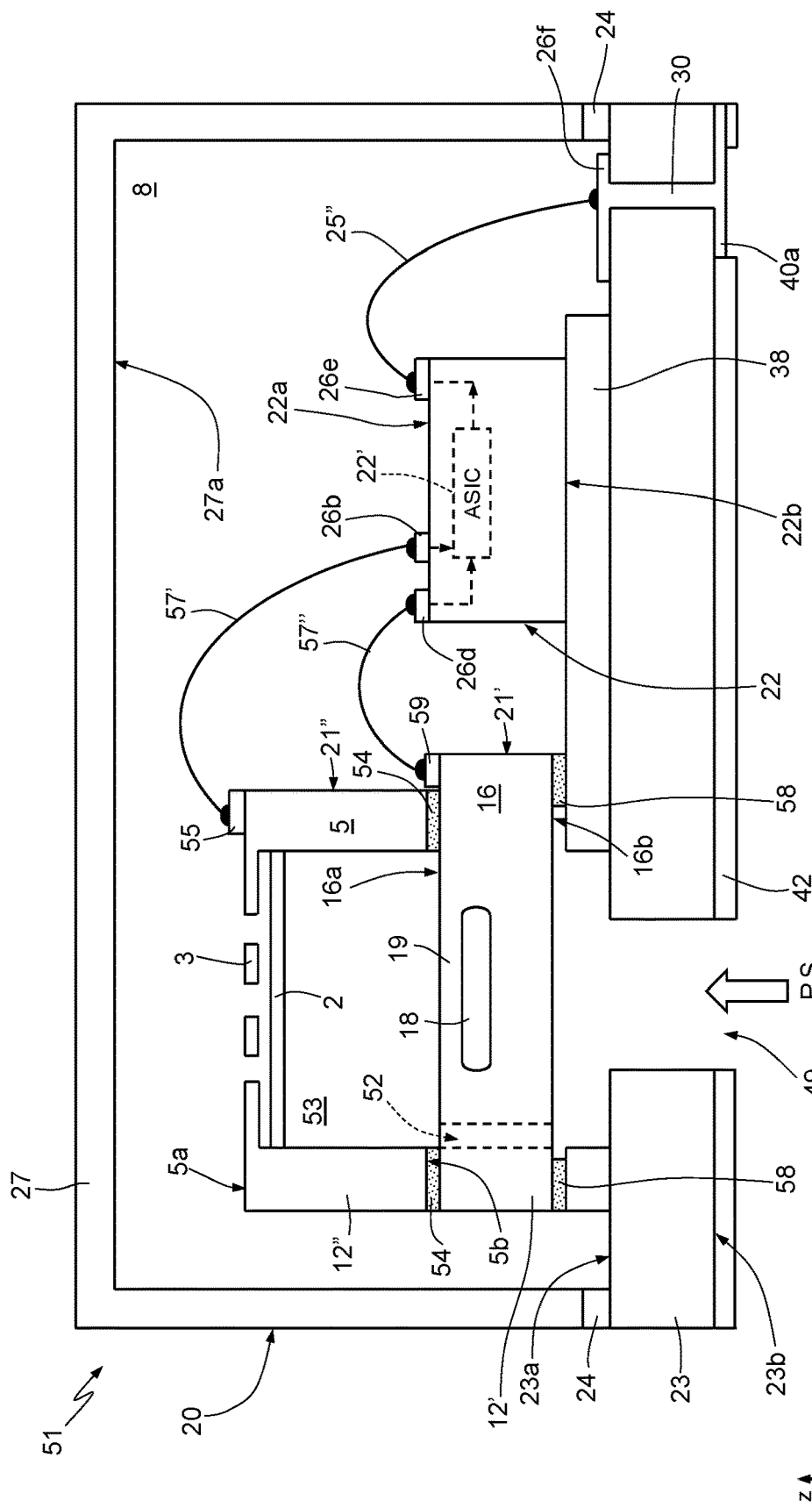

FIG. 2 illustrates, in a system of spatial co-ordinates X, Y, and Z and in lateral-sectional view, a multi-transducer modulus 51 according to a further aspect of the present disclosure. The multi-transducer modulus 51 comprises (in a way similar to what has been described with reference to the multi-transducer modulus 11 of FIG. 1—elements in common are here designated by the same reference numbers and are not described in further detail) a substrate 23 on which a cap 27 is arranged, which defines the chamber 8 and forms, together with the substrate 23, the package 20.

The first and second MEMS transducers 12', 12", integrated in the respective chips 21', 21", are arranged in the chamber 8. The first transducer 12' is, as has been said, a pressure transducer, whereas the second transducer 12" is an acoustic transducer.

The first and second sensor chips 21', 21" are stacked on one another but, unlike what is illustrated in FIG. 1, the embodiment of FIG. 2 envisages that the second sensor chip 21" is mounted on the first sensor chip 21'. Further, unlike what is illustrated in FIG. 1 and described previously, the cap 27 does not have the through opening 39.

More in particular, the first and second sensor chips 21', 21" are arranged so that the membrane 19 overlies, at least in part and in top plan view in the plane XY, the transducer assembly formed by the membrane 2 and the backplate 3.

Thus, in this case, the through opening 49 through the substrate 23 is shared by both the first and second transducers 12', 12", and forms both the access for the environmental pressure P that is detected by the first transducer 12' and the sound port for the sound wave S that is detected by the second transducer 12".

Further, in order to enable the sound wave to reach the membrane 2 of the second transducer 12", the first sensor chip 21' has a through opening 52 configured to fluidically connect the through opening 49 with the membrane 2.

In this context, the chamber 8 forms the back chamber of the second transducer 12", whereas the hollow space that extends between the membrane 2 and the substrate 23 forms a front chamber 53 of the second transducer 12". The front chamber 53 thus includes: the volume comprised between the membrane 2 and the front side 16a of the first sensor chip 21', the through opening 52, and the volume comprised between the rear side 16b and the substrate 23. It should further be noted that also the through opening 49 participates in formation of the front chamber 53.

A coupling region 54 extends between the first and second sensor chips 21', 21", coupling them together. In particular, the coupling region 54 has a thickness comprised between 10 and 100 μm, preferably between 30 and 100 μm and couples together the front surface 16a of the first transducer 12' and the rear surface 5b of the second transducer 12".

According to a non-limiting aspect of the present disclosure, the coupling region 54 is made of non-conductive glue and has, in a view in the plane XY, a frame shape that extends along outer edge regions of the front surface 16a of the structural body 16 and of the rear surface 5b of the structural body 5. The thickness, along Z, of the coupling region 7 co-operates in defining the volume of the front chamber 53. To optimize the performance of the second transducer 12", it is preferable to minimize the volume of the front chamber 53. For this purpose, the thickness of the coupling region 54 is minimized, taking into account the limits of the technology used for forming the coupling region 54. By way of example, the present applicant has found that, in the case where the coupling region 54 is made of glue (in particular, non-conductive glue), a thickness thereof comprised between 30 and 100 μm provides at the same time structural solidity and good performance of the second transducer 12". It is evident that it is possible to reduce the aforementioned thickness by reducing the total thickness of the stack formed by the sensor chips 21', 21", or else to reduce the aforementioned thickness, for example by forming the backplate 3 and the membrane 2 at a height (along Z) lower than the height reached by the front surface 5a.

The first sensor chip 21' is coupled to the substrate 23 at the rear surface 16b of the structural body 16, in particular by the solder mask 38 (already described with reference to FIG. 1) and a coupling layer 58 of adhesive material or glue (preferably non-conductive glue), similar to the layer 31 of FIG. 1. In one embodiment, the coupling layer 58 extends all along the base perimeter of the structural body 16, to form a fluid-tight annular region, which enables fluidic isolation of the front chamber 53 from the chamber 8 (back chamber). In particular, both the solder mask 38 and the coupling layer 58 extend, in a view in the plane XY, laterally with respect to the through opening 49, surrounding it, in order not to obstruct it.

As an alternative to what has been described, the first sensor chip 21' may be coupled to the substrate 23 exclusively through the coupling layer 58, in the absence of the solder mask 38.

In a way similar to what has been described with reference to FIG. 1, the control chip 22 is electrically coupled to the first and second transducers 12', 12" by a plurality of respective conductive wires 57', 57" (only some of which are illustrated in the figure), formed with the wire-bonding technique. The wire bonds 57' connect pads 55 of the second sensor chip 21" to respective pads 26b of the control chip 22b, and the wire bonds 57" connect pads 59 of the first sensor chip 21' to respective pads 26d of the control chip 22.

To be able to form and contact the pads 59 of the first sensor chip 21', the extension in the plane XY of the front surface 16a of the first sensor chip 21' is greater than the extension, once again in the plane XY, of the rear surface 5b of the second sensor chip 21".

The control chip 22 is arranged alongside the stack formed by the second sensor chip 21" mounted on the first sensor chip 21'.

The embodiment of FIG. 2 enables formation of a back chamber of the second transducer 12" having a volume greater than that of the back chamber that may be obtained according to the embodiment of FIG. 1 and, consequently, enables production of an acoustic transducer having a better performance.

Figure 3:
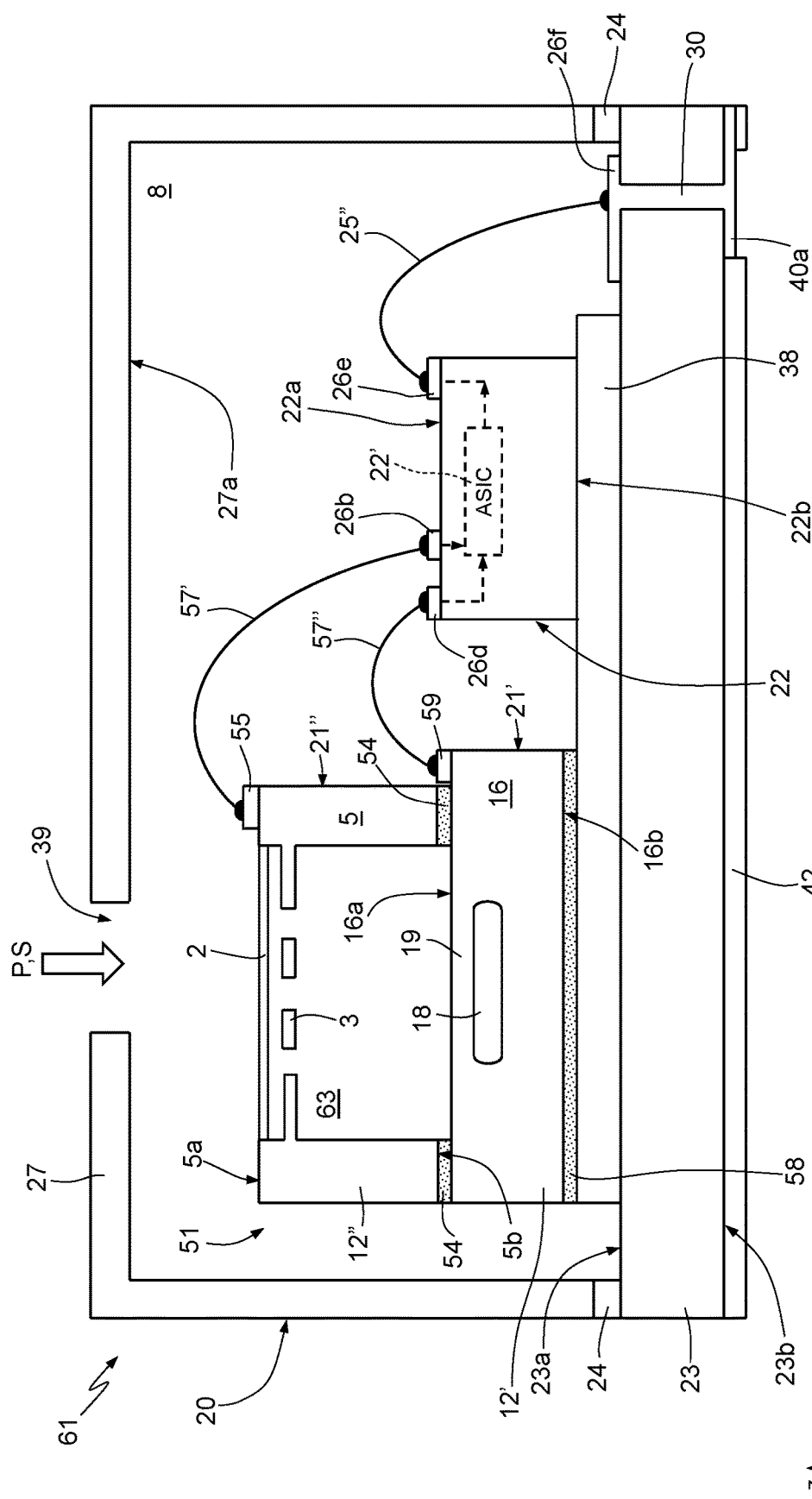

FIG. 3 illustrates, in a system of spatial co-ordinates X, Y, and Z and in lateral-sectional view, a multi-transducer modulus 61 according to a further aspect of the present disclosure. The multi-transducer modulus 61 comprises (in a way similar to what has been described with reference to the multi-transducer modulus 51 of FIG. 2—elements in common are here designated by the same reference numbers and are not described in further detail) a substrate 23 on which a cap 27 is arranged, which defines the chamber 8 and forms, together with the substrate 23, the package 20.

The first and second MEMS transducers 12', 12", integrated in the respective chips 21', 21", are arranged in the chamber 8. The first transducer 12' is a pressure transducer, whereas the second transducer 12" is an acoustic transducer. The first and second sensor chips 21', 21" are stacked on one another, and in particular the second sensor chip 21" is mounted on the first sensor chip 21'. More in particular, the first and second sensor chips 21', 21" are arranged so that the membrane 19 overlies, at least in part and in top plan view in the plane XY, the transducer assembly formed by the membrane 2 and the backplate 3.

Unlike what is illustrated in FIG. 2, the substrate 23 does not have the through opening 49, whereas the cap 27 has the through opening 39. In the absence of the through opening 49, the solder mask 38 and the coupling layer 58 extend continuously underneath the first sensor chip 21'.

With reference to the second transducer 12", the membrane 2, which is mobile and includes a layer of conductive material, faces the backplate 3.

The backplate 3, provided with holes, is at least partially suspended over the structural layer 5 and directly faces a cavity 63, obtained by removing material, such as by etching, at the rear surface 5b (opposite to the front surface 5a) of the structural layer 5. The membrane 2, which in use undergoes deformation as a function of incident sound-pressure waves, extends over of the backplate 3 (i.e., in the proximity of or over the front surface 5a of the structural layer 5) and faces the chamber 8. The cavity 63 is delimited on one side by the backplate 3 and, on the opposite side, by the first sensor chip 21'; the cavity 63 forms, in use, the back chamber of the second transducer 12", whereas the front chamber is formed by the chamber 8.

The through hole 39 in the cap 27 defines a sound port of the second transducer 12" and enables acoustic coupling of the chamber 8 with the environment external to the package 20. The through hole 39 further forms the input port of the pressure signal P detected by the first transducer 12'. In one embodiment, also the membrane 2 has one or more holes (not illustrated in the figure) that form a path for the environmental pressure P towards the first transducer 12'.

Figure 4:
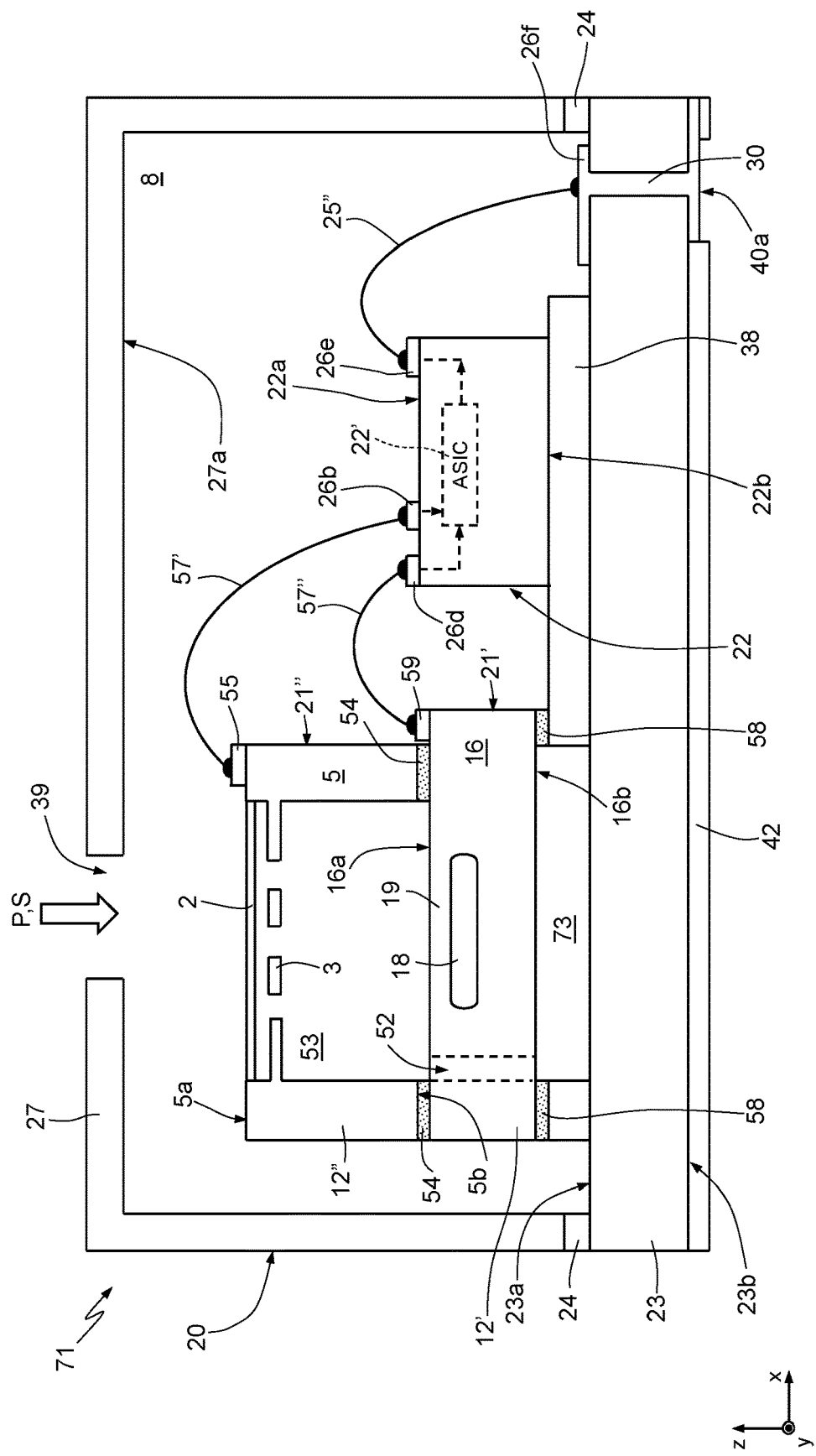

FIG. 4 illustrates, in a system of spatial co-ordinates X, Y, and Z and in lateral-sectional view, a multi-transducer modulus 71 according to a further aspect of the present disclosure. The multi-transducer modulus 71 comprises (in a way similar to what has been described with reference to the multi-transducer modulus 61 of FIG. 3—elements in common are here designated by the same reference numbers and are not described in further detail) the substrate 23 on which the cap 27 is arranged, which defines the chamber 8 and forms, together with the substrate 23, the package 20. The first and second MEMS transducers 12', 12", integrated in the respective chips 21', 21", are arranged in the chamber 8. The first transducer 12' is the pressure transducer, whereas the second transducer 12" is the acoustic transducer. The first and second sensor chips 21', 21" are stacked on one another, and in particular the second sensor chip 21" is mounted on the first sensor chip 21'. More in particular, the first and second sensor chips 21', 21" are arranged so that the membrane 19 overlies, at least in part and in top plan view in the plane XY, the transducer assembly formed by the membrane 2 and the backplate 3.

Unlike what is illustrated in FIG. 3, the first sensor chip 21' has the through opening 52 already described with reference to FIG. 2, and illustrated herein. In a way similar to what has been illustrated in FIG. 2, the solder mask 38 extends only partially underneath the first chip 21', forming a further cavity 73.

The through opening 52 and the cavity 73 have the function of increasing the volume of the back chamber of the second transducer 12", improving its performance as compared to the embodiment of FIG. 3.

Figure 5:
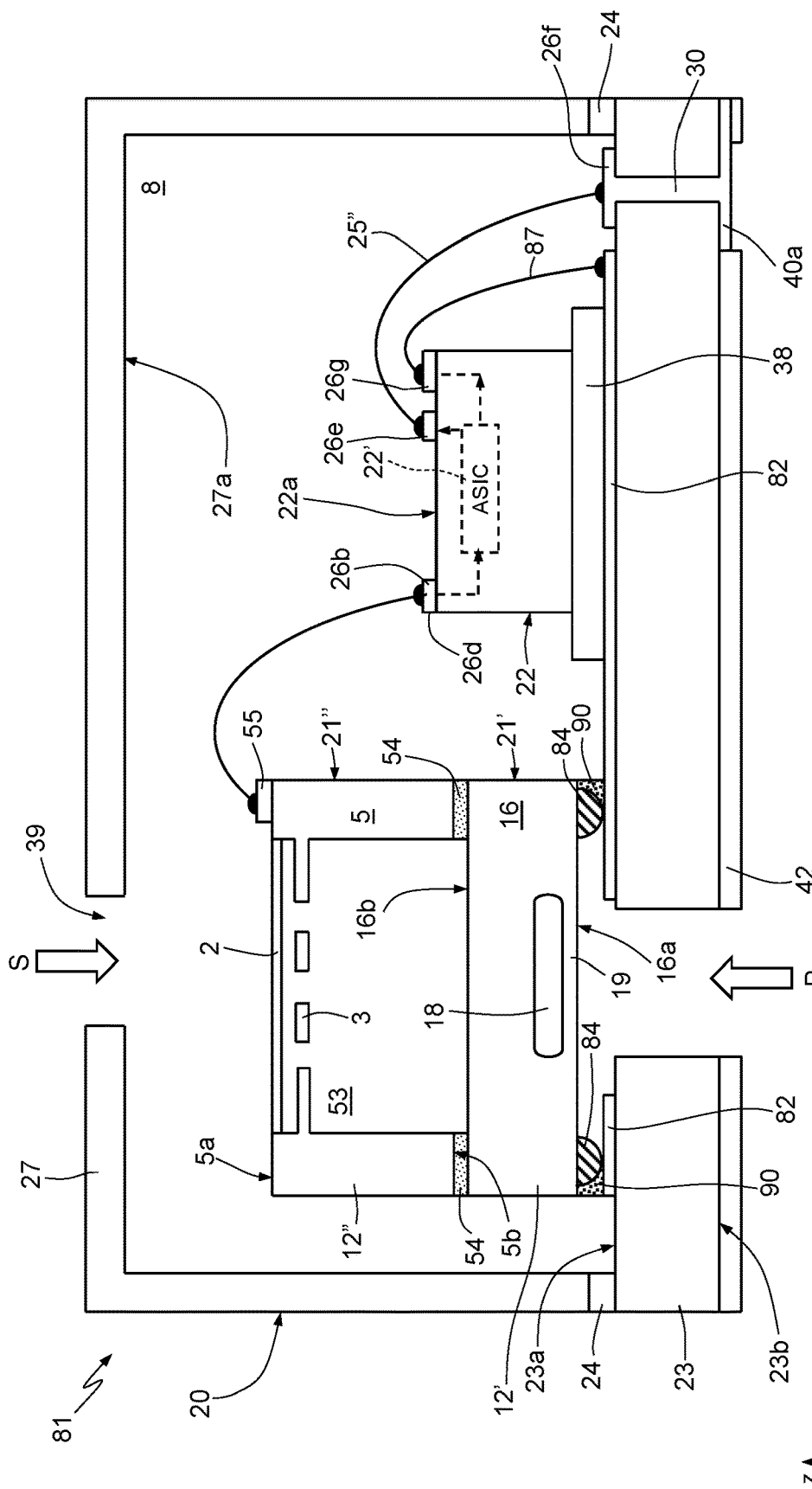

FIG. 5 illustrates, in a system of spatial co-ordinates X, Y, and Z and in lateral-sectional view, a multi-transducer modulus 81 according to a further embodiment of the present disclosure. Elements common to the embodiments previously described are designated by the same reference numbers and are not described in further detail. The multi-transducer modulus 81 comprises a substrate 23 on which a cap 27 is arranged, which defines the chamber 8 and forms, together with the substrate 23, the package 20. The first and second MEMS transducers 12', 12", integrated in the respective chips 21', 21", are arranged in the chamber 8. The first transducer 12' is a pressure transducer, whereas the second transducer 12" is an acoustic transducer. The first and second sensor chips 21', 21" are stacked on one another, and in particular the second sensor chip 21" is mounted on the first sensor chip 21'. More in particular, the first and second sensor chips 21', 21" are arranged so that the membrane 19 overlies, at least in part and in top plan view in the plane XY, the transducer assembly formed by the membrane 2 and the backplate 3.

Even more in particular, the first chip 21' is coupled to the substrate 23 using the flip-chip technology, i.e., with the front surface 16a of the structural body 16 facing the substrate 23 with interposition of solder bumps 84. Consequently, the membrane 19 of the first transducer 12' faces the substrate 23 to receive the environmental pressure P through the through opening 49 made through the substrate 23. Further, in this embodiment, also the cap 27 has the through opening 39 (sound port).

The signals transduced by the piezoresistors of the membrane 19 are, in this embodiment, conveyed by conductive paths 82, which are formed on the substrate 23 and extend at least in part underneath the first transducer 12', in particular between the substrate 23 and the solder bumps 84, to which they are electrically coupled. The conductive paths 82 are further electrically coupled to pads 26g of the control chip 22 by wire bonding (wire bonds 87). In this way, the first transducer 12' is operatively coupled to the control chip 22 via the solder bumps 84, the conductive paths 82, and the wire bonds 87, for transmission of the second transduced signal to the ASIC 22'.

To provide an adequate fluidic isolation between the through opening 49 (environment at pressure P) and the chamber 8, a filling region 90 is present, which forms a frame along peripheral portions of the front surface 16a of the first transducer 12'. The filling region 90 extends outside the solder bumps 84 and is formed, for example, by a non-conductive glue or underfill.

The second chip 21" is mounted on the first chip 21' at the rear surface 16b of the structural body 16, in particular with interposition of the coupling layer 54, which is of the same type as the one already described with reference to FIGS. 2-4. The second chip 21" is of the type already described with reference to FIG. 4, and is thus not described in further detail herein.

Figure 6:
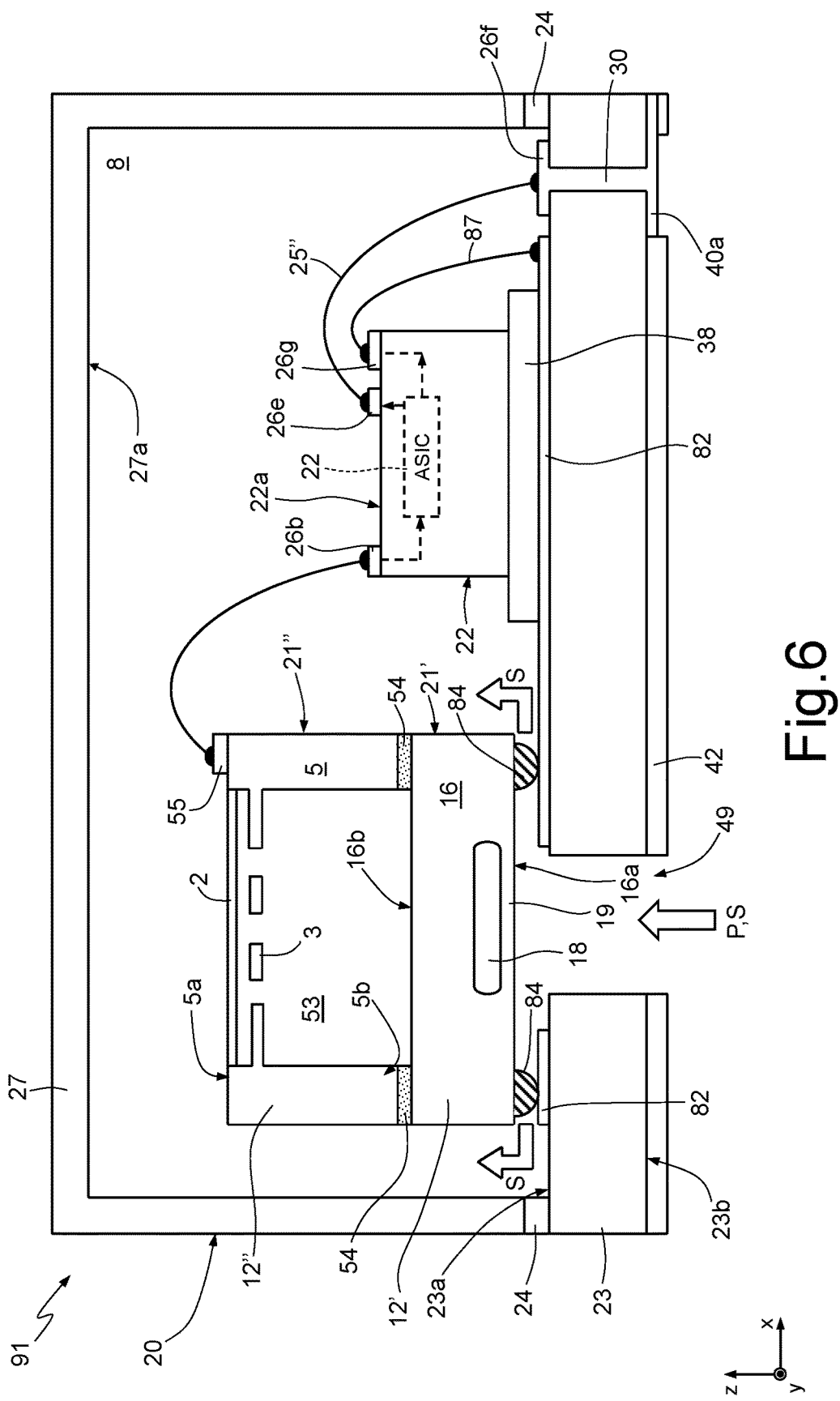

FIG. 6 illustrates a multi-transducer modulus 91 according to a variant of the embodiment of FIG. 5. Elements that are in common are designated by the same reference numbers and are not described any further. In this case, the through opening 39 through the cap 27 is not present. The sound port is thus formed by the through opening 49 made through the substrate 23. In order to enable the sound waves S to reach the chamber 8 (which represents the front chamber of the second transducer 12"), in this embodiment the filling region 90 is not present. Since the solder bumps 84 do not isolate fluidically the through opening 49 from the chamber 8, the sound waves S may flow towards the chamber 8, as desired.

Figure 7:
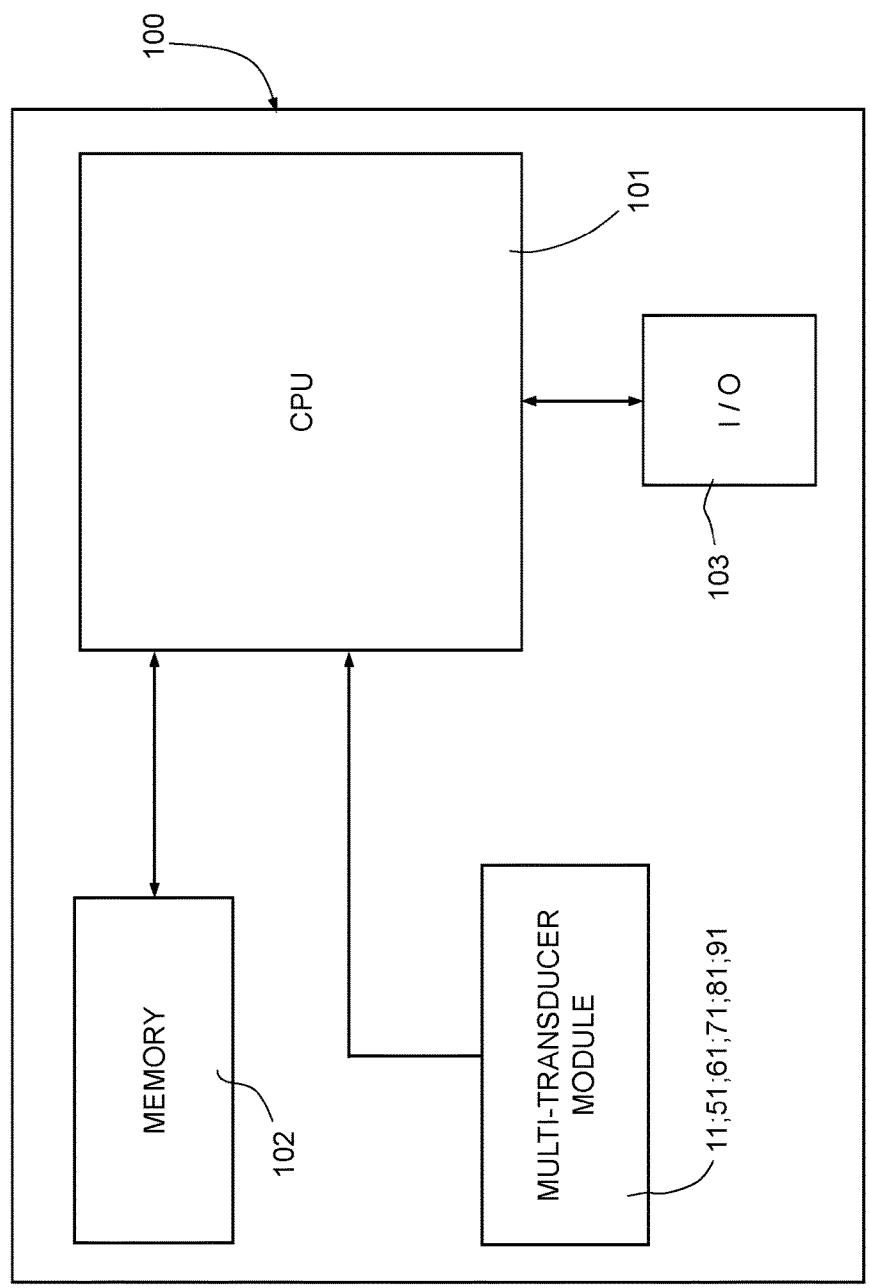
FIG. 7 is a schematic illustration of an electronic apparatus including a multi-transducer modulus according to any one of the embodiments of FIGS. 1-6.

FIG. 7 shows an electronic device 100 that uses the transducer modulus according to any one of the embodiments described previously. The electronic device 100 comprises, in addition to the transducer modulus 11, 51, 61, 71, 81, 91 according to the respective embodiment described, a microprocessor (CPU) 101, a memory block 102, connected to the microprocessor 101, and an input/output interface 103, for example, a keypad and/or a display, also this connected to the microprocessor 101. The transducer modulus 11, 51, 61, 71, 81, 91 communicates with the microprocessor 101, and in particular transmits the electrical signals processed by the shared ASIC.

The electronic device 100 is, for example, a mobile communication device, such as a cellphone, a PDA, a notebook, a camera, or some other device still.

The advantages of the disclosure described previously, according to the various embodiments, emerge clearly from the foregoing description.

In particular, the present disclosure teaches a multi-transducer modulus with optimized occupation of space, with consequent reduction of the costs and improvement of the supply chain, having to manage a smaller number of components on the PCB.

Finally, it is clear that modifications and variations may be made to what has been described and illustrated herein, without thereby departing from the scope of the present disclosure.

In particular, a different configuration of the MEMS transducers may be envisaged, in particular as regards the geometrical shapes of the constituent elements. In the case where the space inside the package so allows, there may possibly be housed inside a same package also a number of MEMS sensors or transducers, each configured to detect a respective environmental quantity.

Further, it is evident that the through opening 39 in the cap 27 may be formed in any region of the cap 27 (at the top, laterally, etc.), according to the need.

In addition, according to further embodiments, the processing chip 22 may be integrated, at least in part, in the substrate 23 or else may be arranged outside the chamber 8. For example, the processing chip 22 may form part of a PCB on which the package 20 is mounted. In this case, the transduced signal generated by the transducers 12', 12" is supplied to the external processing chip by the electrical-connection elements 40a, which receive the transduced signals by appropriate electrical connections with the transducers 12', 12". Said electrical connections include wire bonding, and/or conductive paths formed on the substrate 23 or integrated therein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transducer modulus, comprising:
a supporting substrate;
a cap coupled to the supporting substrate, the cap and the supporting structure defining a chamber;
a stack in the chamber, the stack including:
a pressure transducer having a first sensitive element configured to detect an environmental pressure and generate a first transduced signal as a function of the environmental pressure detected; and
an acoustic transducer coupled to the pressure transducer, the acoustic transducer having a second sensitive element configured to detect a sound wave and generate a second transduced signal as a function of the sound wave detected, wherein the first sensitive element of the pressure transducer and the second sensitive element of the acoustic transducer are stacked vertically with respect to each other;
a layer of adhesive material that forms a fluid-tight region between the pressure transducer and the acoustic transducer; and
a processing chip housed at least in part in the chamber, the processing chip operatively coupled to the pressure transducer and to the acoustic transducer and configured to receive the first and second transduced signals.

2. The transducer modulus according to claim 1, wherein the acoustic transducer is arranged on the pressure transducer.

3. The transducer modulus according to claim 1, wherein:
the supporting substrate includes an access opening configured to provide a path for the sound wave and the environmental pressure to enter the chamber;
the stack includes a cavity between the second sensitive element and the pressure transducer forming, at least in part, a front chamber of the acoustic transducer; and
the pressure transducer is integrated in a first sensor chip having a through hole adapted to set in fluidic communication the access opening with the cavity to form an access path for providing the sound wave to the second sensitive element.

4. The transducer modulus according to claim 1, wherein:
the cap includes an access opening configured to provide a path for the sound wave and the environmental pressure to enter the chamber;
the stack has a first cavity between the second sensitive element and the pressure transducer forming, at least in part, a back chamber of the acoustic transducer, and
the acoustic transducer is integrated in a second sensor chip.

5. The transducer modulus according to claim 4, wherein the pressure transducer is integrated in a first sensor chip suspended over the supporting substrate, thereby defining a second cavity between the first sensor chip and the supporting substrate,
wherein the first sensor chip has a through hole that fluidicly couples the first cavity with the second cavity.

6. The transducer modulus according to claim 1, wherein the pressure transducer is coupled to the supporting substrate by one or more from among: a layer of glue, an adhesive layer, and a solder mask.

7. The transducer modulus according to claim 1, wherein:
the pressure transducer has a first surface facing the chamber and includes the first sensitive element, wherein the pressure transducer is coupled to the supporting substrate at the first surface by solder bumps arranged at a distance from one another so as to form one or more fluidic paths towards the chamber; and
the supporting substrate has a through opening that provides an access path of the environmental pressure towards the first sensitive element, the through opening and the one or more fluidic passages between the solder bumps forms an access path of the sound wave to the second sensitive element.

8. The transducer modulus according to claim 1, wherein:
the pressure transducer has a first surface, the first sensitive element located at the first surface, the pressure transducer being further coupled to the supporting substrate at the first surface by solder bumps and a fluid-tight annular region that surrounds the solder bumps;
the supporting substrate has a through opening forming an fluidic access path for providing the environmental pressure to the first sensitive element; and
the cap has a respective window facing the chamber and forming an access path for providing the sound wave to the second sensitive element.

9. The transducer modulus according to claim 1, wherein the acoustic transducer is coupled to the pressure transducer by a layer of glue that forms a fluid-tight frame-shaped or ring-shaped region.

10. The transducer modulus according to claim 9, wherein the layer of glue has a thickness between 10 µm and 100 µm.

11. The transducer modulus according to claim 1, wherein the stack includes the pressure transducer arranged on the acoustic transducer.

12. The transducer modulus according to claim 11, wherein the acoustic transducer is coupled to the supporting substrate by at least one coupling region that includes at least one of a solder mask, a layer of glue, or an adhesive layer.

13. The transducer modulus according to claim 1, wherein the processing chip is operatively coupled to the pressure transducer and to the acoustic transducer by wire bonds.

14. The transducer modulus according to claim 1, wherein the supporting substrate includes semiconductor material or epoxy resin.

15. The transducer modulus according to claim 1, wherein the second sensitive element includes a diaphragm and a backplate capacitively coupled the diaphragm, the diaphragm being configured to deflect as a function of sound waves received and thus generate the second transduced signal.

16. A transducer modulus comprising:
a supporting substrate having a first through opening;
a cap coupled to the supporting substrate, the cap including a second through opening, the cap and the supporting structure defining a first chamber, the second through opening being in fluid communication with the first chamber;
a stack in the chamber covering the first through opening, the stack including:
a pressure transducer having a first sensitive element configured to detect an environmental pressure and generate a first transduced signal as a function of the environmental pressure detected; and
an acoustic transducer coupled to the pressure transducer, the acoustic transducer having a second sensitive element configured to detect a sound wave and generate a second transduced signal as a function of the sound wave detected, wherein the pressure transducer is coupled to the acoustic transducer by at least one coupling layer of glue having a thickness between 30 µm and 100 µm; and
a processing chip housed at least in part in the chamber, the processing chip operatively coupled to the pressure transducer and to the acoustic transducer and configured to receive the first and second transduced signals.

17. The transducer modulus according to claim 16, wherein the cap has a through opening that provides an access path for providing the environmental pressure to the first sensitive element, and the supporting substrate has a through opening configured to that provides an access path for providing the sound wave to the second sensitive element.

18. An electronic apparatus, comprising:
a microprocessor; and
a transducer modulus coupled to the microprocessor, the transducer modulus including:
a substrate;
a cap coupled to the substrate and forming an inner chamber;
a pressure transducer and an acoustic transducer in the chamber and coupled to each other in vertically-stacked manner and forming an internal chamber, the pressure transducer having a first sensitive element configured to detect an environmental pressure and generate a first transduced signal as a function of the environmental pressure detected, the acoustic transducer having a second sensitive element configured to detect a sound wave and generate a second transduced signal as a function of the sound wave detected, wherein the pressure transducer includes a through opening that places the internal chamber in fluid communication with the inner chamber; and
a processing chip located at least partially in the chamber, the processing chip operatively coupled to the pressure transducer and to the acoustic transducer, the processing chip being configured to receive the first and second transduced signals.

19. The electronic apparatus according to claim 18, wherein the electronic apparatus is at least one of a cellphone, a personal digital assistant, a notebook, a voice recorder, an audio player with voice-recording function, a console for videogames, a hydrophone, a photographic camera, and a video camera.

20. A method, comprising:
vertically stacking a pressure transducer and an acoustic transducer together on a supporting substrate;
coupling a processing chip on the supporting substrate;
operatively coupling the processing chip to the pressure transducer and to the acoustic transducer; and
coupling a cap to the supporting substrate and defining a chamber that houses the stacked pressure transducer and the acoustic transducer and, at least in part, the processing chip.

21. The method according to claim 20, wherein the vertically stacking comprises coupling the acoustic transducer on the pressure transducer.

22. The method according to claim 20, wherein the vertically stacking comprises coupling the acoustic transducer to the supporting substrate and coupling the pressure transducer to the acoustic transducer.

23. The method according to claim 20, wherein the pressure transducer includes a membrane facing a first direction, the acoustic transducer includes a membrane facing a second direction, the second direction being opposite the first direction.

* * * * *